United States Patent [19]

Denton

[11] 4,006,087
[45] Feb. 1, 1977

[54] FLUID DISTRIBUTION SYSTEM
[75] Inventor: Thomas James Denton, Tulsa, Okla.
[73] Assignee: Combustion Engineering, Inc., Windsor, Conn.
[22] Filed: May 23, 1975
[21] Appl. No.: 580,432
[52] U.S. Cl. .................................. 210/289; 210/291
[51] Int. Cl.² ........................................ B01D 23/20
[58] Field of Search .......... 210/289, 291, 292, 293

[56] References Cited
UNITED STATES PATENTS 3,189,181   6/1965   Couse .............................. 210/291

FOREIGN PATENTS OR APPLICATIONS 45-36481   11/1970   Japan ................................. 210/293

Primary Examiner—Thomas G. Wyse
Assistant Examiner—Ivars Cintins
Attorney, Agent, or Firm—Arthur L. Wade

[57] ABSTRACT

Conduit segments are mounted above a horizontal plate which supports an upper bed of media. The segments have perforations formed on their underside. A screen is draped over each segment and extends down the sides of a cradle mounted on the plate to support the segment. The screen laterally supports the media and functions to isolate the media from a fluid volume beneath the perforations in the underside of the conduit.

2 Claims, 2 Drawing Figures

FLUID DISTRIBUTION SYSTEM

BACKGROUND OF THE INVENTION

1. Field of the Invention

The present invention relates to fluid drain structure at the bottom of beds of media through which the fluid passes. More particularly, the invention relates to placing conduit segments of a manifold for the fluid in the lower portion of the media bed with distribution perforations in the segments isolated from the media so the media is not bearing directly on, or over, the apertures.

2. Description of the Prior Art

Beds of granular media are commonly placed inside vessels and fluids passed through the media. Most of such units are more or less simple filters to remove undesirable material from the fluid. However, there are many different materials to be removed from fluid streams and many different materials useful as bed media.

The problem of present concern is in distributing fluid over the horizontal face of the media bed. The prior art is replete with distribution systems whose essential elements are plates with spaced apertures or porous bodies. These perforated plates and porous bodies are usually placed to span their vessel containing the media near its bottom. Fluid is conducted into, or removed from, the vessel below the plate and bodies.

In the prior art, the media bed has rested directly over and on the plate openings of porous bodies. The bed is supported by the plate or body structure. Of course the particles of media must be sized larger than the holes in the plate or porous bodies or the particles will pass through the holes and be lost downstream. If there is a rupture of the plate, its holes enlarged accidently, or the media particles fragmented, media will be lost. It is desired, therefore, that the media be supported but not have direct contact with distribution apertures for fluid. Rupture of porous support structure for the media should not result in direct loss of media particles downstream of the vessel from the media bed. All improvements to support structure should improve fluid distribution horizontally over the cross section of the bed with structure which is simple to fabricate and assemble.

SUMMARY OF THE INVENTION

The present invention provides support for one or more connected conduit segments above a horizontal partition in a vessel containing filter media above the partition. The conduits are connected to an entrance-exit conduit formed through a vessel wall, and the conduits are perforated on their underside for fluid to exit from the conduits into the media or enter the conduits from the media. While supported by cradle structure above their partition, each conduit segment is provided with a screen which is draped over the segment and sealed to the cradle and partition to provide a volume between the perforations and the screen in which fluid is distributed as it flows from the perforations and through the screen and into the media or flows from the bed and through the screen and into the perforations.

The invention also provides for a fluid tight compartment to include the horizontal partition to structurally support the partition, conduit segments and media. This support permits the use of relatively light plate for the partition.

Other objects, advantages and features of this invention will become apparent to one skilled in the art upon consideration of the written specification, appended claims, and attached drawings, wherein;

DESCRIPTION OF THE PREFERRED EMBODIMENT

Figure 1:
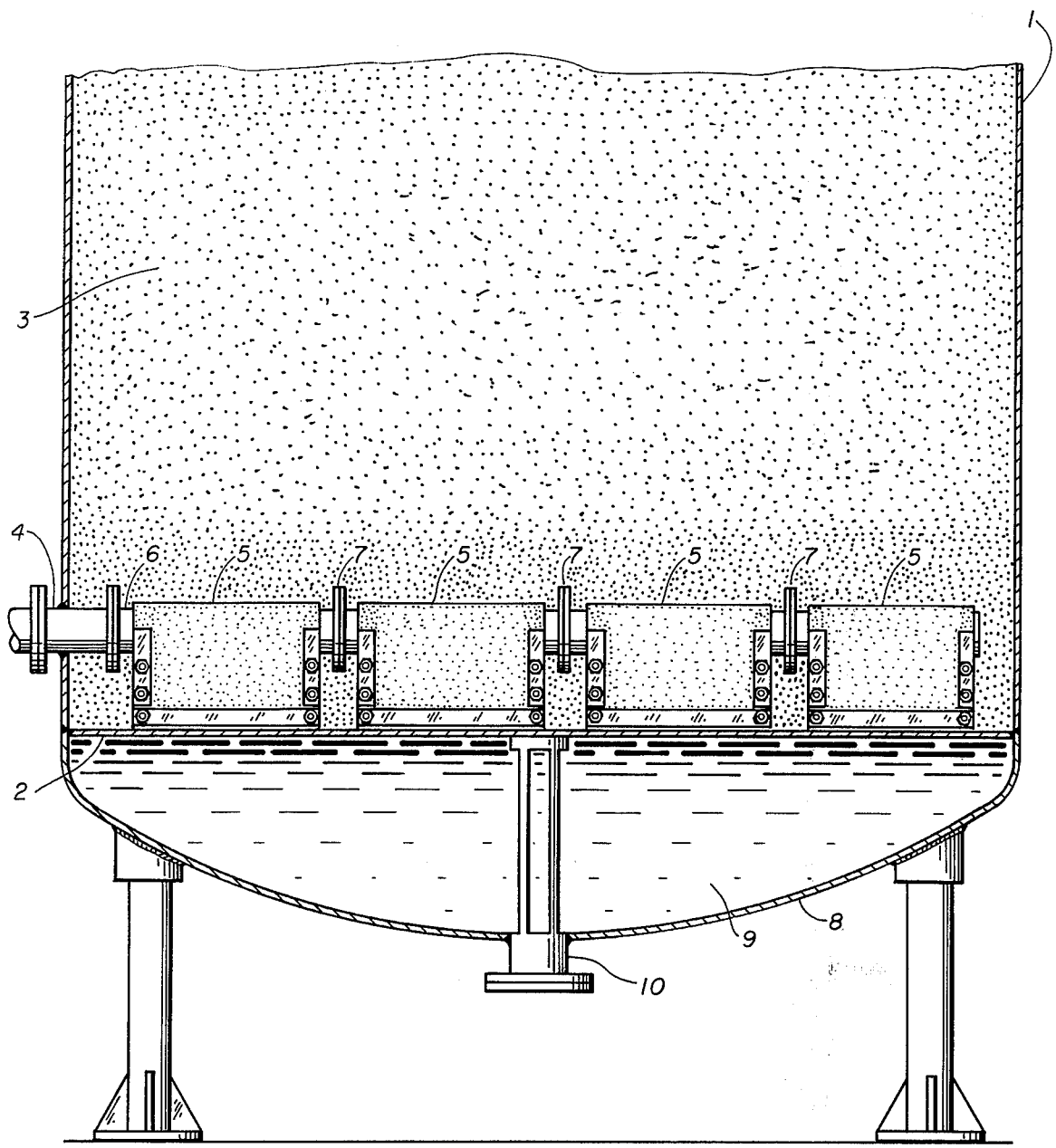
FIG. 1 is a sectioned side elevation of the lower portion of a vessel in which is mounted a fluid distribution system embodying the present invention.

FIG. 1 is a very clear, simple, detailed drawing representing the lower portion of a vertical vessel shell 1 in which the invention is embodied in a fluid distribution system. The vertical shell has a partition 2 extended horizontally completely across the vessel. This partition functions as the floor of the vessel and functions to support media bed 3.

Generally, it is almost obvious that the arrangement is to flow fluid up through the bed 3 or down through the bed 3. Whatever the process objective, the fluid is passed through the media bed. The present invention is concerned with transfer of the fluid into the media or out of the media.

The fluid is passed into, or out of, the bed 3 through conduit 4 which is extended through the wall of vessel shell 1. It is obvious that the source of the fluid connected to conduit 4 need not be disclosed. Also, no disposal point for fluid from conduit 4 need be disclosed. The invention is embodied in the structure within the vessel shell 1, mounted above and on partition 2 and in the lower end of bed 3.

More specifically, the invention is grounded by the conduit segments 5 which are connected to each other as a manifold and to conduit 4. The central element of each conduit section 5 is its conduit 6. As is even more clear from FIG. 2, this conduit 6 is perforated along its lower length. The fluid flows into, and out of, conduit 6 through these perforations. Thus the invention provides a fluid volume below the perforations of conduit 6, and above partition 2, for the distribution of fluid. This volume is isolated from the particles of bed media so the fluid will readily flow to and from the perforations. Never before has an underdrain system for a media bed provided an isolated fluid volume of this configuration.

The segments 5 are most simply manifolded together with flanged connections as shown at 7. It is readily apparent from observation of the drawings that segments of standard length can be joined to extend horizontally across vessel shell 1. The complete area above the partition 2 can be provided a manifold network with a tee connection provided between segments 5, branches of the manifold can be extended as desired, at right angles from the manifold shown in FIG. 1.

Also, the invention can be looked upon as having a scope to include additional support structure provided beneath partition 2. Partition 2 may have a relatively large area. The bed and manifold of segments 5 can become a large downward force. Of course, it is desirable to use relatively inexpensive, light material for partition 2. It is the fluid support disclosed for this partition 2 that makes a relatively light plate practical for partition 2.

My concept is embodied in the dished head 8 of shell 1 and partition 2 forming a fluid tight compartment 9 between them. A conduit 10 is provided through the wall of compartment 9 and a fluid introduced to fill compartment 9. This fluid packed compartment is a neat way to provide an effective but inexpensive support for the underdrain system. From some viewpoints, this structure can be considered as falling within the scope of the invention.

Figure 2:
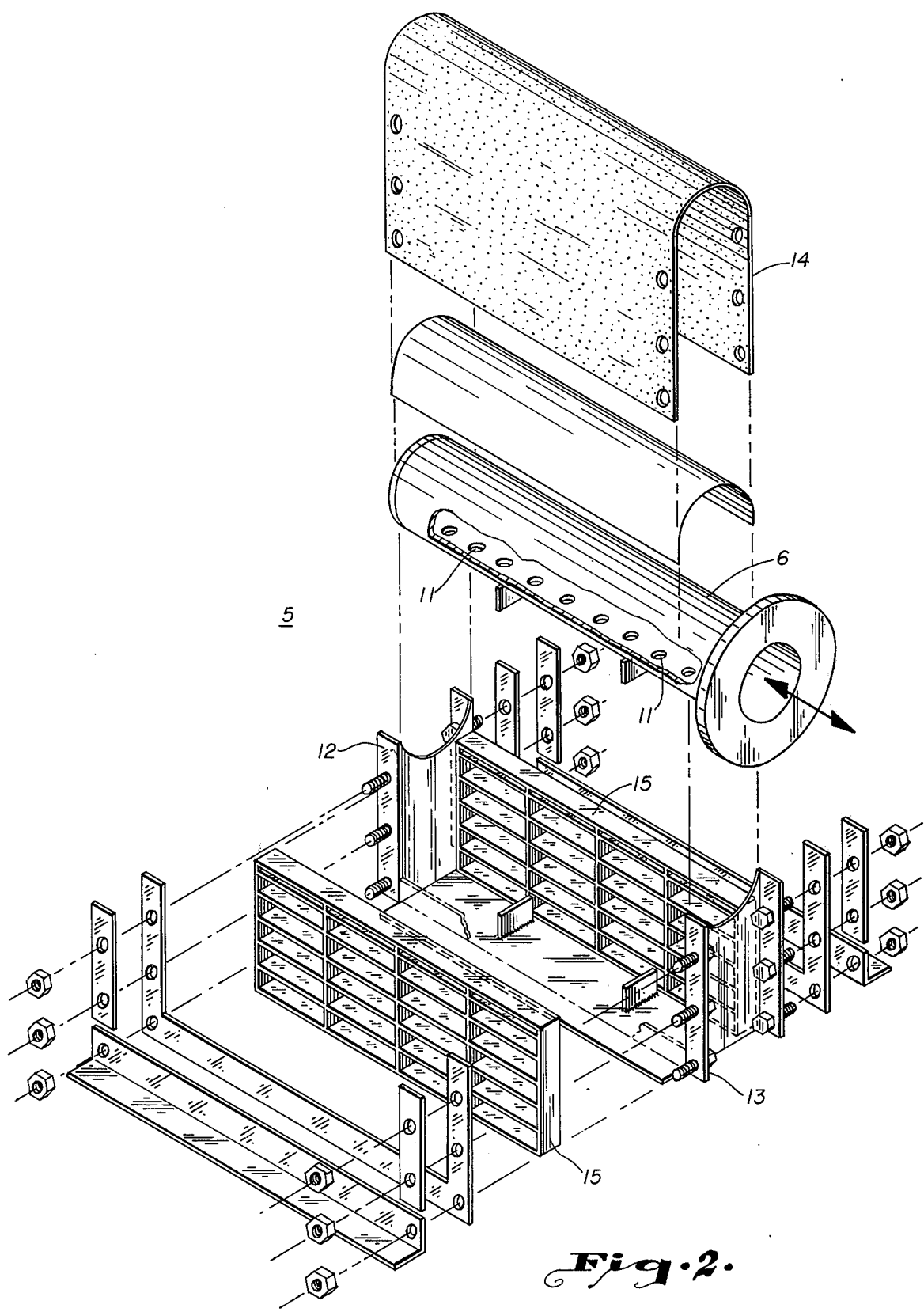
FIG. 2 is an exploded perspective view of a conduit segment of the distribution system of FIG. 1.

The main thrust of the invention — the basic contribution to advance the art — is in the cradle and screen structure provided for conduit 6. In FIG. 2 all of this structure has been exploded to make it simple and clear how the parts of the structure are each of simple manufacture and can be readily assembled.

Conduit 6 dominates the assembly of FIG. 2. This is the conduit segment cradled above the partition 2. Perforations 11 are spaced along the underside of conduit 6 as described in connection with FIG. 1.

The cradle for conduit 6 may be basically developed from two end pieces 12 and 13 as shown. These pieces are in the form of simple channels held parallel and segmented on their upper ends to receive conduit 6 as a cradle.

Screen, or mesh, 14 is draped over conduit 6. Screen 14 extends the length of conduit 6 and down to partition 2. It is then clamped-bolted-sealed to the sides of channels 12 and 13 and partition 2 to insure that access to perforations 11 is only through the mesh of screen 14.

Screen 14 has a large surface as it extends on each side of conduit 6 down to partition 2. Bed media 3 bears laterally against this screen. Fluid flowing through the screen develops a differential pressure across the screen. Therefore, it is desirable to provide a grating support for the screen.

Grating 15 is provided beneath conduit 6 and within the volume beneath the perforations. Fixed in place by any suitable combination of plates, strips or abutments, grating 15 backs up relatively fragile screen form, or mesh, 14 as it isolates the bed media while passing fluid which flows to and from perforations 11.

CONCLUSION

I have been directly involved in quoting, building, installing and operating water treating systems for many years. As an engineer I have always been concerned with the crude approach my profession has made to filters for water. The art has many structures and practices which are accepted but which I believe need improvement. The list of needed improvements is long. The problem I have solved with my invention here is only one of many.

I have put up with the simple, perforated plate and porous blocks long enough. I have seen media lost and the drain systems foul too many times. My present solution to this problem came suddenly. My concept first provided getting the fluid passage off the bottom of the bed support plate. It next demanded isolation of these passages from the media particles. I embodied my concept with a conduit along the bottom of the bed. I raised it up and perforated it the length of its underside.

Next I draped a screen over the conduit and secured it around the perforations on the undersides of the conduit. This gave me a fluid chamber which isolated the perforations from the media. Finally, I backed the delicate screen with grating for structural support. The bed and manifold add to form an inherently heavy burden, but I quickly provided a fluid-tight compartment below the plate support. Fluid, particularly incompressible liquid, would then give all the support required for the heavily burdened plate.

My invention does not solve all the problems of this type of fluid filter. However, it does successfully attack the underdrain problem. The structural embodiment of my concepts clearly teach the art my solution to this particular problem that has long been a concern of mine.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. A drain system for a bed of granular media supported within a vessel, including,
   a horizontal plate mounted in the lower portion of a vessel,
   a pair of simple channels mounted by their first ends on the horizontal plate to extend vertically and segmented on their upper ends,
   a conduit segment of tubular form having perforations the length of the underside of the conduit segment and fitted into and supported at each end within the segmented upper ends of the channels and connected to a conduit which extends through the vessel wall,
   a rigid support grating extending between the sides of the channels and beneath the conduit to form an unobstructed volume beneath the perforations,
   and a screen structure draped over the pipe segment and channel and sealed to the channel sides and plate to fix its mesh openings as a part of the path for fluid flowing to and from the perforations while laterally supported by the grating to isolate the media particles from the perforations.

2. The system of claim 1 in which,
   a fluid-packed chamber is formed with and below the horizontal plate to provide structural support for the plate and drain structure mounted on the top of the plate.

* * * * *